July 7, 1936.  H. MORGENROTH  2,046,527
SHOCK ABSORBER FOR VEHICLES
Filed May 9, 1935
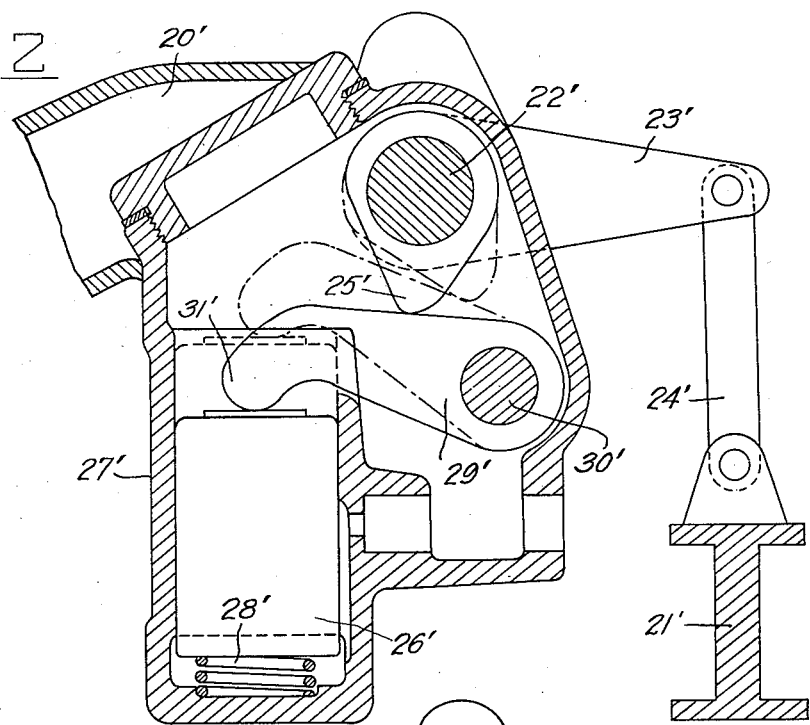
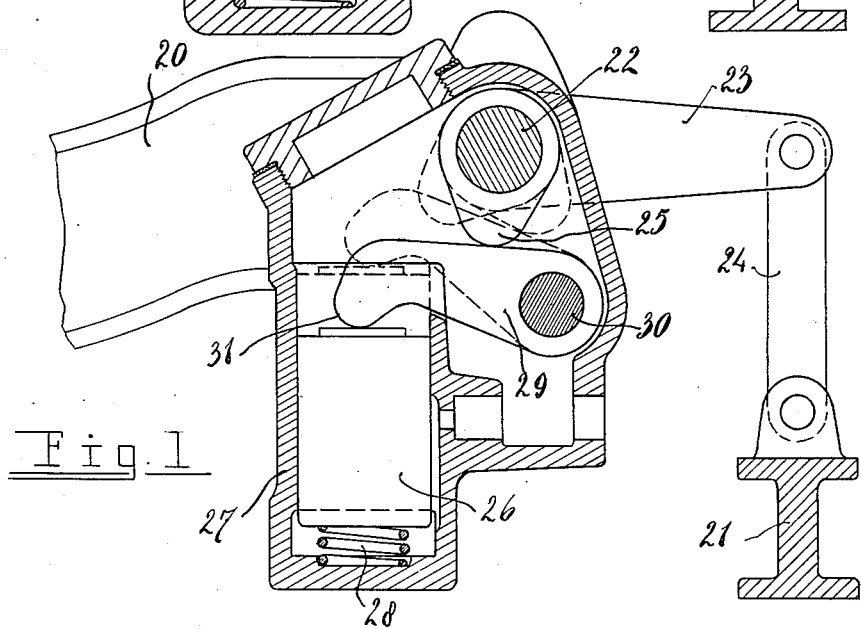

Patented July 7, 1936

2,046,527

UNITED STATES PATENT OFFICE 2,046,527

SHOCK ABSORBER FOR VEHICLES

Henri Morgenroth, Le Chesnay, France, assignor to N. V. De Schelde, Amsterdam, Netherlands Application May 9, 1935, Serial No. 20,645
In Germany October 3, 1933

2 Claims. (Cl. 267—8)

My invention relates to shock absorbers for motor and other vehicles and more especially to that type of devices of this kind, which exert their braking action on the vehicle frame only when the wheel axle is returning into its position of rest, i. e. during the upper half of its downward movement and the lower half of its upward movement.

The typical means for operating such shock absorber is a cam acting on a piston arranged for reciprocation against the action of a spring in a cylindrical casing filled with oil or some other damping medium. In the normal position of the vehicle spring this cam, in order to be able to act as described above, must assume its dead centre position, and the piston will then move upwardly, during the upward and downward movements of the wheel axle, without offering any resistance, the check valve opening to allow the damping liquid to pass through freely. On the other hand, when the axle returns into its position of rest, the piston will move downwardly both during the ascending and descending movements of the axle, braking the movement of the axle under the action of a throttle valve preventing rapid passage of the liquid.

Apparently a shock absorber of this particular type should be far more efficient as regards the damping of oscillations than the normal absorbers which are operative throughout the upward and downward stroke of the piston, since by cutting out the braking action during compression of the vehicle spring, when riding over a projection of the ground, or during expansion of the spring, when passing through a depression of the ground, the well known obnoxious increase of the first oscillation of the vehicle frame is avoided by the shock absorber. Nevertheless the tests conducted with shock absorbers of this known type have not furnished satisfactory results. This is due to the fact that the action of these shock absorbers is the same during upward as well as during downward motion, since, as mentioned above, the piston, when damping the oscillations, moves downwardly in either case, always actuating the same throttle valve. However, the damping effect of a shock absorber should always be weaker in the upward than in the downward direction, since with increasing speed the axle, which, when riding over a projection, is forced to give way upwardly, imparts to the shock absorber an ever increasing acceleration which finally equals a rigid connection between the axle and the vehicle frame. On the other hand, when passing through a depression of the ground, the axle is not at all compelled to at once enter this depression, the wheel being lifted, at higher speeds, off the ground, so that there results a maximum velocity of downward motion of the axle and consequently also an acceleration in downward direction, brought about by the shock absorber, which is never overstepped.

These considerations show clearly that in view of the frequently occurring higher upward velocity of the axle a shock absorber which shall not damp oscillations more vigorously in upward than in downward direction, must be adjusted for much lesser action in this direction than in the downward direction.

It has already been suggested to bring about a different action of the shock absorber in one and the other direction by causing the cam or the piston to actuate different throttle valves. Such devices are, however, unduly complicated and very sensitive against disturbances.

It has further been suggested to shape the cam or the piston surface cooperating with it in such manner as to cause the upward stroke of the piston to become shorter than its downward stroke. Shock absorbers of the type aforesaid, however, involve the disadvantage that the piston stroke will be comparatively short and moreover, on the cam returning to its dead centre position, since it acts on the piston with a transversal component, the piston may have the tendency of jamming. Apart therefrom it may be desirable to obtain an action other than sinoidal. While this might be obtained by forming the piston with an uneven operating surface, the result would be unsatisfactory in view of the high side pressure resulting therefrom.

In the drawing affixed to this specification and forming part thereof two forms of a shock absorber embodying my invention are illustrated diagrammatically by way of example.

In the drawing

Fig. 1 is an axial section of the first modification showing a cam of symmetrical configuration acting on a single-armed lever which in turn acts on the piston, while Fig. 2 is a similar view of the second modification, in which a cam of asymmetrical form depresses a single-armed lever which in its turn acts on the piston.

Referring to the drawing, 20 is the vehicle frame, 21 the wheel axle, 22 the cam shaft, 23 the lever arm fixed to this shaft, 24 the link connecting this arm to the wheel axle and 25 the cam which in this case is of the usual symmetrical form. 26 is the piston mounted for reciprocation in the cylindrical portion of the casing 27 of the shock absorber, 28 being the coil spring tending to lift the piston.

29 is a single-armed lever fixed to a journal 30 supported in bearings in the casing 27, this lever arm 29 acting on the top surface of the piston 26 with a rounded extension 31. The cam 25 acts on the lever 29 between its pivot point and its end. Consequently, if the cam returns from the right into its dead centre position, since it acts on a part of the lever arm 29 comparatively close to its pivot, the extent of the angular movement of the lever arm 29 will be greater than if the cam returns to the dead centre position from the left, when it acts on a portion of the lever comparatively remote from the pivot, i. e. on a longer lever arm. The two extreme positions of the cam 25 are shown in the drawing in dash lines and it will be seen that with the cam in its right hand end position the lever arm will be able to rise to a greater extent than if the cam assumes its left hand end position. In this modification of the shock absorber the lever 29 always acts on the middle portion of the piston surface, so that here all injurious side pressure is avoided. The active surface of the lever arm 29, which is acted upon by the cam, is shown to be straight and plane. If it is desired to obtain a damping curve other than sinoidal, this surface of the lever arm may be shaped accordingly without any obnoxious side pressures being exerted on the piston. Obviously here any desired variations may be obtained by replacing the symmetrical cam by an asymmetrical one.

A detail of a modification of the improved shock absorber, in which an asymmetrical cam acts on the intermediate single-armed lever, is shown by way of example in Fig. 2, where 20' is the vehicle frame, 21' the wheel axle, 22' the cam shaft, 23' the lever arm fixed to this shaft, 24' the link connecting this arm to the wheel axle and 25' the cam which is of asymmetrical shape. 26' is the piston mounted for reciprocation in the cylindrical portion of the casing 27' of the shock absorber, 28' being the coil spring tending to lift the piston.

29' is a single-armed lever fixed to the journal 30', this lever arm 29' acting on the top surface of the piston 26' with a rounded extension 31'. The cam 25' acts on the lever 29' between its pivot point and its end, acting differently when turned to either side of its dead centre position. Consequently, the asymmetrical shape of the cam 25' forms an easy means of predetermining, in combination with the shape and dimensions of the single-armed lever, the difference between the upward and downward strokes of the piston 26'.

Obviously in all cases the cams here shown might be replaced by eccentrics carrying rollers.

I wish it to be understood that I do not desire to be limited to the exact details of construction shown and described for obvious modifications will occur to a person skilled in the art.

I claim:—

1. A shock absorber comprising in combination, a damping piston, a cam arranged to be oscillated by the action of shocks and a single-armed lever between said piston and said cam, the end of said lever resting on said piston, the circumferential surface of said cam contacting with a point intermediate the end of the surface and the pivot point of said lever.

2. A shock absorber comprising in combination, a damping piston, a cam arranged to be oscillated by the action of shocks and a single-armed lever between said piston and said cam, the end of said lever resting on said piston, the circumferential surface of said cam contacting with a point intermediate the end of the surface and the pivot point of said lever in a manner such that the distance between said contact point and said pivot point varies with varying positions of said cam, one of the contacting surfaces being asymmetrically formed.

HENRI MORGENROTH.